Patented Nov. 21, 1950

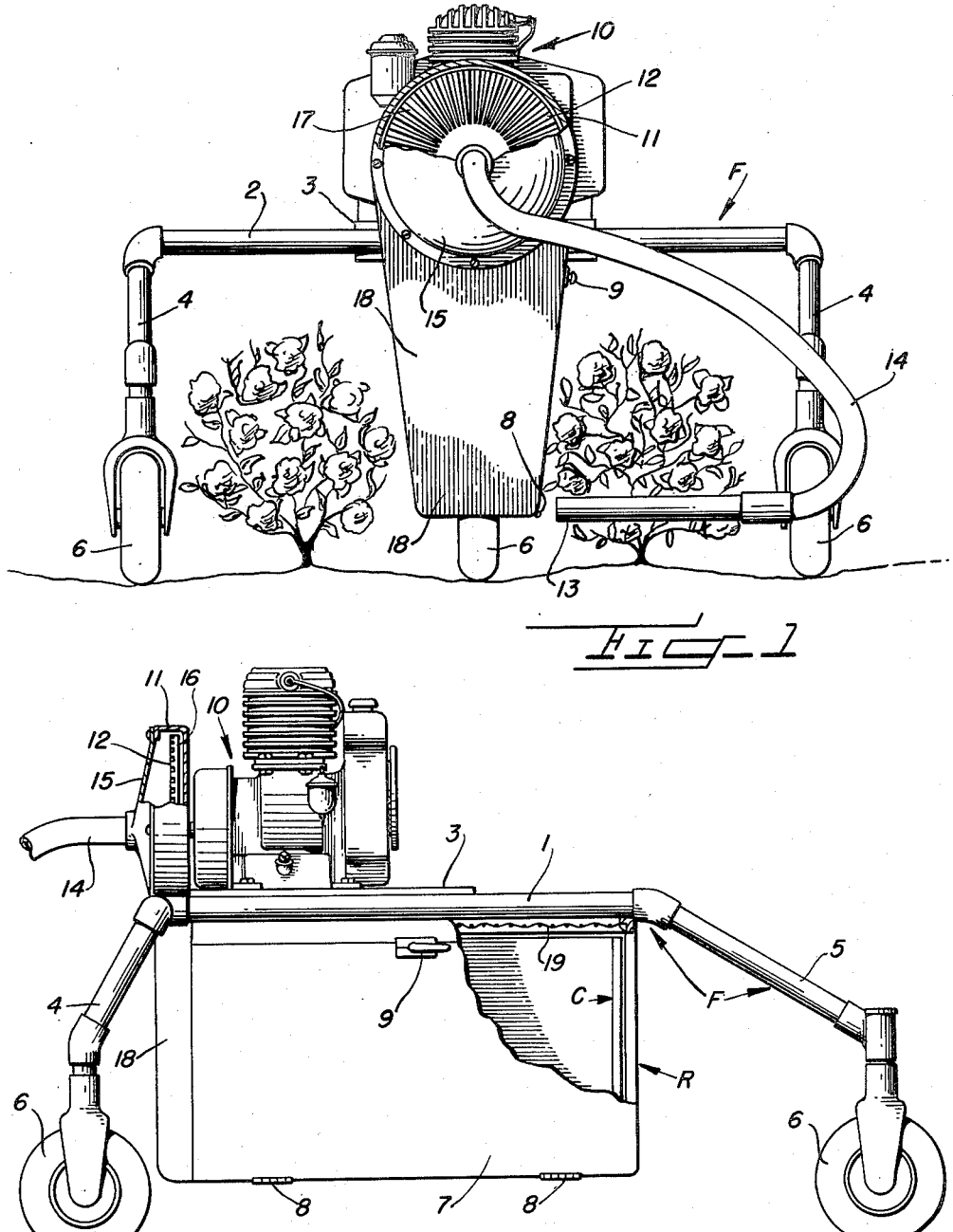

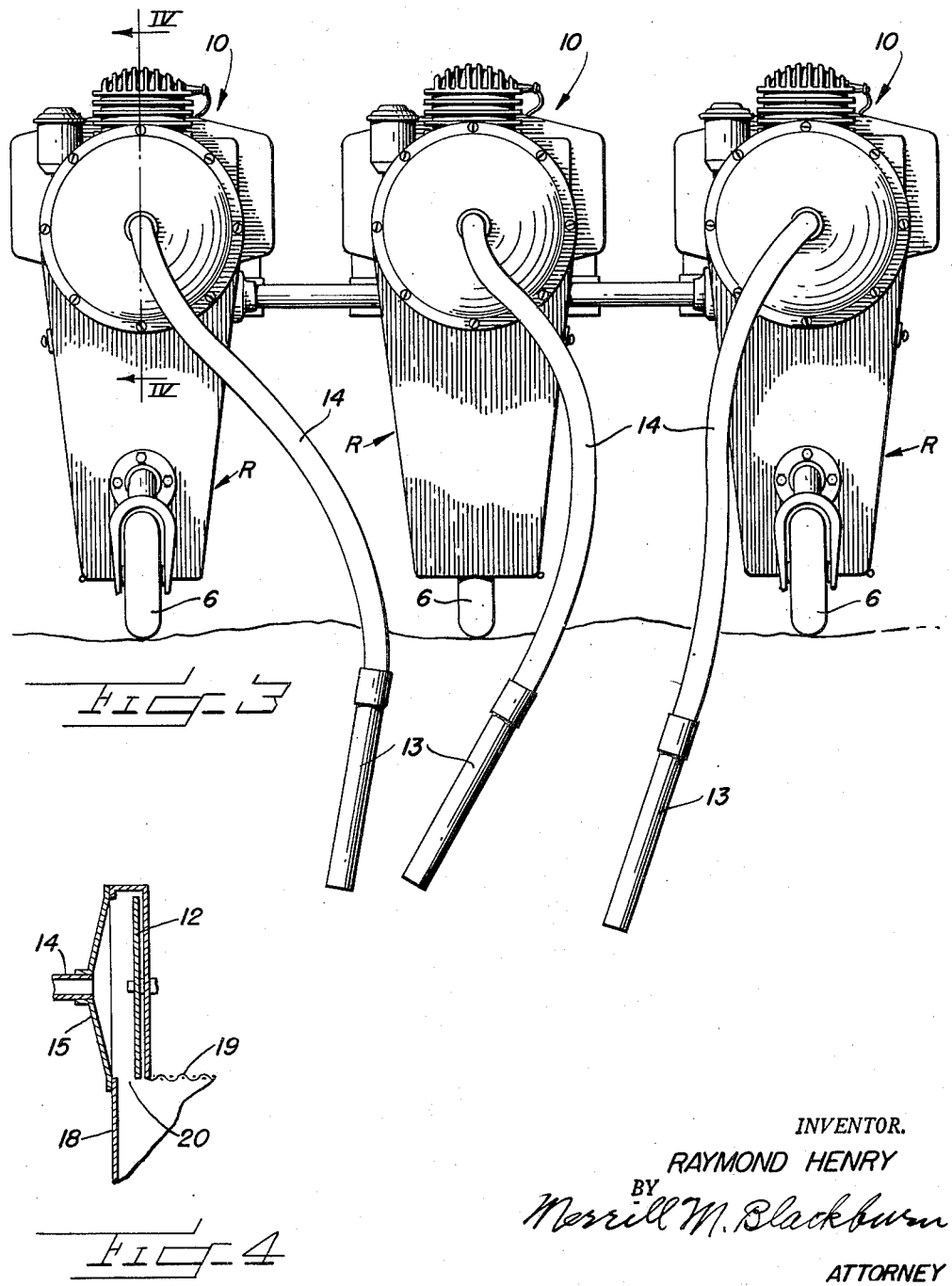

2,531,041

UNITED STATES PATENT OFFICE 2,531,041

PNEUMATIC COTTON HARVESTER

Raymond Henry, Moline, Ill.

Application October 25, 1948, Serial No. 56,378

1 Claim. (Cl. 56—13)

My present invention relates to mechanical means for picking cotton to be used in substitution for manual picking and for less efficient mechanical pickers. Among the objects of this invention are the provision of means for increasing the amount of cotton picked, per man employed; the provision of means for eliminating a substantial amount of the refuse commonly present in cotton picked by prior machines; the provision of a machine superior in results to machines heretofore on the market; the provision of a mechanical cotton picker which will remove the cotton from cotton bolls as rapidly as a man can point an air tube at the cotton bolls; and such further objects, advantages, and capabilities as will hereafter appear and as are inherent in the machine disclosed herein. My invention further resides in the combination, construction, and arrangement of parts illustrated in the accompanying drawings and, while I have shown therein what is now regarded as the preferred embodiment of this invention, and a slight modification thereof, I desire the present disclosure to be regarded as illustrative only and not to be interpreted in a limiting sense.

In the accompanying drawings,

Fig. 1 represents a front elevation of one form of embodiment of this invention;

Fig. 2 represents a side elevation of the structure shown in Fig. 1;

Fig. 3 represents a front elevation of this structure arranged for use of a plurality of pickers working simultaneously; and Fig. 4 is a section on line 4—4 of Fig. 3.

Cotton pickers in accordance herewith comprise a housing which has a circular portion and a portion extending downwardly from the lower section of the circular portion. The picker has a flexible cotton picking pipe communicating with the circular portion axially thereof. A vaned rotor is positioned axially within the circular portion with the vaned surface facing said inlet and spaced therefrom. The vaned rotor is spaced from the opposed face of said housing to allow passage of bolls therebtween, and thence into the downwardly extending portion of the housing. A receiver is provided communicating horizontally directly with said downwardly extending portion of the housing.

Reference will now be made in greater detail to the annexed drawings for a more complete description of this invention. There is shown at F the framework of this machine which has side rails 1, front and rear cross-rails 2, legs 4 and 5, and a plurality of wheels 6 for supporting the body of the machine and upon which it is transported through a field and from place to place. Supported upon the frame F is a suitable platform 3 upon which the operative mechanism is carried and upon which the operator may ride during the picking operation. A cotton receptacle or box-like hopper R is suspended from the frame F and has therein a container C for the picked cotton, which container may be removed from the receptacle R for the removal of the cotton. Any suitable hinged door 7 is connected by hinges 8 to the body of the receptacle R and has a suitable catch 9 for holding the door closed.

Mounted on the platform 3 is a high speed motor 10, the shaft of which extends into the blower housing 11 in which is the rotor 12, mounted upon the shaft of the motor 10 so that the rotor 12 is driven directly by the motor, at high speed. The purpose of that is to produce high speed travel of the ambient air which passes through the cotton and into the nozzle 13 of the pipe 14, discharging through the connection of the pipe to the cap plate 15 of the housing 11. The essential for the success of this machine is its ability to produce rapid travel of the air, not vacuum. The air-moving element or rotor 12 comprises a plate 16 having on its forward face, preferably, a large number of vanes 17 which take the entering air and throw it out from the plate 16 with the cotton which makes its escape into the hollow header 18 through passage 20, and from there into the container C. The plate 16 is connected directly to the motor shaft of a high speed motor and is therefore not subject to the slippage common in belt-driven machines. This is one way in which the slowing down of air stream is avoided.

The receptacle R preferably has one face closed by a wire mesh cloth 19, or its equivalent, mounted on the receptacle R, as shown in Fig. 2. This holds the cotton against escape from the container C which gradually fills up with cotton. When the container is sufficiently filled, the machine is stopped and the cotton emptied out to be taken to the gin or elsewhere.

If it is desired to have more than one operator, a plurality of motors and cooperating parts are mounted on the platform 3 and there is an operator for each of them who takes hold of a nozzle 13 and directs it toward the bolls, one after another. When the air enters a nozzle 13 at a high velocity, and the nozzle is close to the bolls, the result is that the cotton will leave the bolls and enter the nozzle 13 to be discharged into the container C. The effect is as if a very strong wind were blowing through the bolls and this strong wind would blow the cotton into the container C.

One of the disadvantages of a spindle machine is the high cost of production of the machine and the high cost of upkeep thereof, the spindles being greatly subject to breakage during use. Another difficulty experienced with some cotton pickers is the fact that the cotton is forced against metal parts, contacting therewith at such a speed that many of the seed hulls are broken, which is undesirable. With the present machine, contact of seed hulls with metal parts causing breaking of the hulls is substantially eliminated.

With the present machine, the rate of cotton picking per man can be speeded up to about four times the prior rate, and the cotton is much cleaner, resulting in a higher price for the product when sold.

It is of course understood that the specific description of structure set forth herein may be departed from without departing from the spirit of this invention as set forth in this specification and as defined in the appended claim.

Having now described my invention, I claim:

In a pneumatic cotton harvester, the combination which comprises a substantially horizontally disposed frame, wheels mounted on depending legs of the frame and supporting the frame in an elevated position, a box-like hopper, the upper end of which is open, carried by and depending from said frame, a removable cotton receiving container positioned in said hopper, a wire mesh cover extended over the said hopper, a horizontally disposed platform positioned on said frame, a motor mounted on said platform, a blower having a centrally disposed inlet connection and a peripheral discharge mounted on one end of said platform and positioned with the said discharge in communication with the interior of the said hopper and container therein, and a hose with a cotton suction nozzle on the outer end extended from the said inlet connection of the blower.

RAYMOND HENRY.

REFERENCES CITED

The following references are of record in the file of this patent:

UNITED STATES PATENTS

| Number | Name | Date |
|---|---|---|
| 988,566 | Getchell | Apr. 4, 1911 |
| 1,346,282 | Tibbs | July 13, 1920 |
| 1,417,782 | Stukenborg | May 30, 1922 |
| 1,751,376 | Watkins | Mar. 18, 1930 |
| 1,844,785 | Nelson | Feb. 9, 1932 |
| 1,862,384 | Millar | June 7, 1932 |
| 1,887,831 | Willett et al. | Nov. 15, 1932 |